(12) United States Patent
Karczewicz et al.

(10) Patent No.: US 9,143,803 B2
(45) Date of Patent: Sep. 22, 2015

(54) FILTER PREDICTION BASED ON ACTIVITY METRICS IN VIDEO CODING

(75) Inventors: Marta Karczewicz, San Diego, CA (US); Giovanni Motta, San Diego, CA (US); Peisong Chen, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 12/687,487

(22) Filed: Jan. 14, 2010

(65) Prior Publication Data

US 2010/0177822 A1    Jul. 15, 2010

Related U.S. Application Data

(60) Provisional application No. 61/144,873, filed on Jan. 15, 2009, provisional application No. 61/178,346, filed on May 14, 2009.

(51) Int. Cl.
*H04N 7/12*     (2006.01)
*H04N 11/02*    (2006.01)
*H04N 11/04*    (2006.01)
(Continued)

(52) U.S. Cl.
CPC ............. *H04N 19/86* (2014.11); *H04N 19/117* (2014.11); *H04N 19/14* (2014.11); *H04N 19/196* (2014.11); *H04N 19/46* (2014.11); *H04N 19/463* (2014.11); *H04N 19/61* (2014.11); *H04N 19/80* (2014.11); *H04N 19/82* (2014.11)

(58) Field of Classification Search
CPC .................... H04N 19/00551; H04N 19/0089; H04N 19/00545; H04N 19/00781; H04N 19/00157

USPC ................. 375/240.12; 352/244; 348/345
See application file for complete search history.

(56) References Cited

U.S. PATENT DOCUMENTS 4,974,065 A    11/1990 Murakami et al.
5,610,729 A     3/1997 Nakajima
(Continued)

FOREIGN PATENT DOCUMENTS

CA    2547954 A1    7/2005
EP    1033883 A1    9/2000
(Continued)

OTHER PUBLICATIONS

International Search Report and Written Opinion—PCT/US2010/021239, International Search Authority—European Patent Office—Sep. 27, 2010.

(Continued)

*Primary Examiner* — Hee-Yong Kim
(74) *Attorney, Agent, or Firm* — Todd E. Marlette

(57) ABSTRACT

This disclosure describes techniques associated with filtering of video data in a video encoding and/or decoding process. In accordance with this disclosure, filtering is applied at an encoder, and filter information is encoded in the bitstream to identify the filtering that was applied at the encoder. Different types of filtering may be applied based on an activity metric determined for the video data. Moreover, in accordance with this disclosure, the manner in which the filter information is encoded into the bitstream may be dependent on the activity metric. In particular, for a first range of the activity metric, one or more filters are encoded directly, and for a second range of the activity metric, one or more filters are predictively encoded.

43 Claims, 6 Drawing Sheets

(51) Int. Cl.
*H04N 5/232* (2006.01)
*G03B 13/00* (2006.01)
*G03B 15/08* (2006.01)
*G06K 9/40* (2006.01)
*H04N 19/86* (2014.01)
*H04N 19/46* (2014.01)
*H04N 19/196* (2014.01)
*H04N 19/61* (2014.01)
*H04N 19/117* (2014.01)
*H04N 19/463* (2014.01)
*H04N 19/14* (2014.01)
*H04N 19/80* (2014.01)
*H04N 19/82* (2014.01)

(56) References Cited

U.S. PATENT DOCUMENTS

| | | | |
|---|---|---|---|
| 5,798,795 | A | 8/1998 | Glenn et al. |
| 5,844,613 | A | 12/1998 | Chaddha |
| 5,930,397 | A | 7/1999 | Tsujii et al. |
| 6,370,279 | B1 | 4/2002 | Paik |
| 6,504,872 | B1 | 1/2003 | Fimoff et al. |
| 6,983,079 | B2 | 1/2006 | Kim |
| 7,003,038 | B2 | 2/2006 | Divakaran et al. |
| 7,076,114 | B2 | 7/2006 | Westerman |
| 7,203,234 | B1 | 4/2007 | Zeng |
| 7,289,154 | B2 | 10/2007 | Gindele |
| 7,391,812 | B2 | 6/2008 | Pun et al. |
| 7,453,938 | B2 | 11/2008 | Haskell et al. |
| 7,460,596 | B2 | 12/2008 | Kwon et al. |
| 7,702,013 | B2 | 4/2010 | Schwarz et al. |
| 7,809,207 | B2 | 10/2010 | Dumitras et al. |
| 7,894,524 | B2 | 2/2011 | Demos |
| 7,903,179 | B2 | 3/2011 | Morino |
| 7,916,965 | B2 | 3/2011 | Chiu et al. |
| 8,374,246 | B2 | 2/2013 | Raveendran et al. |
| 2001/0023454 | A1 | 9/2001 | Fitzgerald |
| 2003/0026495 | A1 | 2/2003 | Gondek et al. |
| 2003/0117585 | A1* | 6/2003 | Lee ................................ 352/244 |
| 2003/0169931 | A1 | 9/2003 | Lainema |
| 2004/0008787 | A1 | 1/2004 | Pun et al. |
| 2004/0161035 | A1 | 8/2004 | Wedi |
| 2006/0028562 | A1 | 2/2006 | Schmitz et al. |
| 2006/0095612 | A1 | 5/2006 | Fitzgerald |
| 2006/0193529 | A1 | 8/2006 | Boon et al. |
| 2006/0268990 | A1 | 11/2006 | Lin et al. |
| 2006/0285597 | A1 | 12/2006 | Gupta et al. |
| 2006/0294171 | A1 | 12/2006 | Bossen et al. |
| 2007/0053373 | A1 | 3/2007 | Fitzgerald et al. |
| 2007/0064798 | A1 | 3/2007 | Paniconi et al. |
| 2007/0140574 | A1 | 6/2007 | Yamaguchi et al. |
| 2007/0165282 | A1 | 7/2007 | Sambongi et al. |
| 2007/0230565 | A1 | 10/2007 | Tourapis et al. |
| 2008/0019605 | A1 | 1/2008 | Yea et al. |
| 2008/0024513 | A1 | 1/2008 | Raveendran |
| 2008/0063085 | A1 | 3/2008 | Wu et al. |
| 2008/0240559 | A1 | 10/2008 | Malvar |
| 2009/0022220 | A1 | 1/2009 | Vatis et al. |
| 2009/0086816 | A1 | 4/2009 | Leontaris et al. |
| 2009/0257668 | A1 | 10/2009 | Ye et al. |
| 2009/0290637 | A1 | 11/2009 | Lai et al. |
| 2010/0008430 | A1 | 1/2010 | Karczewicz et al. |
| 2010/0014763 | A1 | 1/2010 | Wittmann et al. |
| 2010/0023336 | A1 | 1/2010 | Shmunk |
| 2010/0053415 | A1* | 3/2010 | Yun ................................ 348/345 |
| 2010/0092100 | A1* | 4/2010 | Madnani ........................ 382/255 |
| 2010/0104027 | A1 | 4/2010 | Youn et al. |
| 2010/0142844 | A1 | 6/2010 | Pereira et al. |
| 2010/0220788 | A1 | 9/2010 | Wittmann et al. |
| 2010/0284458 | A1 | 11/2010 | Andersson et al. |
| 2010/0284461 | A1* | 11/2010 | Andersson et al. ...... 375/240.12 |
| 2011/0026599 | A1 | 2/2011 | Andersson et al. |
| 2011/0274158 | A1 | 11/2011 | Fu et al. |
| 2015/0117554 | A1 | 4/2015 | Chong et al. |
| 2015/0117555 | A1 | 4/2015 | Chong et al. |

FOREIGN PATENT DOCUMENTS

| | | | |
|---|---|---|---|
| EP | 1408697 | A1 | 4/2004 |
| EP | 1432249 | A1 | 6/2004 |
| EP | 1499134 | A1 | 1/2005 |
| EP | 1513349 | A2 | 3/2005 |
| EP | 1603338 | A1 | 12/2005 |
| EP | 2262267 | A1 | 12/2010 |
| JP | 61002482 | A | 1/1986 |
| JP | 2005501442 | A | 1/2005 |
| JP | 2005514872 | A | 5/2005 |
| JP | 2007506361 | A | 3/2007 |
| RU | 2295203 | C2 | 3/2007 |
| RU | 2302707 | C2 | 7/2007 |
| TW | 201034467 | A | 9/2010 |
| WO | 0154415 | A1 | 7/2001 |
| WO | WO-03058945 | A2 | 7/2003 |
| WO | 2005034517 | A1 | 4/2005 |
| WO | 06012384 | | 2/2006 |
| WO | WO2006108654 | A2 | 10/2006 |
| WO | 2007111292 | A1 | 10/2007 |
| WO | WO2008038238 | A2 | 4/2008 |
| WO | 2008075247 | A1 | 6/2008 |
| WO | WO2008084378 | A2 | 7/2008 |
| WO | WO2008148272 | | 12/2008 |
| WO | WO2011126759 | A1 | 10/2011 |

OTHER PUBLICATIONS

Karczewicz M., et al., "Post-filter applicability to intra coding" 33. VCEG Meeting; 83. MPEG Meeting; Dec. 1, 2008-Jan. 13, 2008; ANTALYA; (Video Coding Experts Group of ITU-T SG.16) No. VCEG-AH26, Jan. 9, 2008, XP030003564 the whole document.

Chujoh, et al., "Quadtree-based Adaptive Loop Filter", ITU-T SG16 Contribution, C181, Geneva, Jan. 2009.

Fu, et al., "CE8 Subset3: Picture Quadtree Adaptive Offset", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document JCTVC-D122, pp. 1-10.

Ikai, et al., "Region-based adaptive loop filter using two-dimensional feature", Joint Collaborative Team on Video Coding (JCT-VC) of ITU-T SG16 WP3 and ISO/IEC JTC1/SC29/WG11, Document JCTVC-D116, 4th Meeting: Daegu, KR, Jan. 20-18, 2011, pp. 1-12.

K. Kawamura et al, "Adaptive loop filtering using directional activity", JCTVC-E190, Mar. 2011.

Karczewicz M, et al., "Post-filter hint SEI message extensions" 35. VCEG Meeting; 85. MPEG Meeting; Jul. 16, 2008-Jul. 18, 2008; Berlin; (Video Coding 'Experts Group of ITU-T SG.16), Jul. 12, 2008, XP030003599.

Lai, et al., "Loop filter with directional similarity mapping (DSM)", Joint Collaborative Team on Video Coding (JCT-VC) of ITU-T SG16 WP3 and ISO/IEC JTC1/SC29/WG11, Document JCTVC-D221, 4th Meeting: Daegu, KR, Jan. 20-28, 2011, pp. 1-8.

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Vatis Y et al.: "Coding of coefficients of two-dimensional non-separable adaptive Wiener interpolation filter" Proceeding of the SPIE—The International Society for Optical Engineering, SPIE, PO Box 10 Bellingham WA 98227-0010 USA, vol. 5960, Jul. 12, 2005, pp. 623-631, XP002419200.

Vatis Y et al: "Motion-and Aliasing-Compensated Prediction Using a Two-Dimensional Non-Separable Adaptive Wiener Interpolation Filter" Image Processing, 2005. ICIP 2005. IEEE International Conference on Genova, Italy Sep. 11-14, 2005, Piscataway, NJ, USA, IEEE, vol. 2, Sep. 11, 2005, pp. 894-897, XP010851198 ISBN: 978-0-7803-91 34-5.

Wiegand T et al: "Overview of the H.264/AVC video coding standard" IEEE Transactions on Circuits and Systems for Video Tech-

(56) References Cited

OTHER PUBLICATIONS nology, IEEE Service Center, Piscataway, NJ, US, vol. 13, No. 7, Jul. 2003, pp. 560-576, XP011099249.
Wittmann, Steffen et al. "Transmission of Post-Filter Hints for Video Coding Schemes", IEEE International Conference on Image Processing, Sep. 16, 2007-Oct. 19, 2007, 4 pages, vol. 1.
Anonymous: "Tool Experiment 10: In-loop filtering", 2. JCT-VC Meeting; Jul. 27, 2010-Jul. 28, 2010; Geneva; (Joint Collaborative Team on Video Coding of ISO/IEC JTC1/SC29/WG11 and ITU-T SG.16); URL: http://wftp3.itu.int/av-arch/JCTVC-site/, No. JCTVC-B310, Aug. 30, 2010, XP030007715, ISSN: 0000-0046 p. 1 p. 9.
Chen C. Y., et al., " CE8 Subtest2: A Joint Proposal on Improving the Adaptive Loop Filter in TMuC0.9 by MediaTek, Qualcomm, and Toshiba", 4. JCT-VC Meeting; 95. MPEG Meeting; Jan. 20, 2011-Jan. 28, 2011; Daegu; (Joint Collaborative Team on Video Coding of ISO/IECJTC1/SC29/WG11 and ITU-TSG.16); URL: http://wftp3.itu.int/av-arch/JCTVC-Site/,, No. JCTVC-D119, Jan. 15, 2011, XP030008159, ISSN: 0000-0015 p. 2, paragraph 2-paragraph 2.1; figure 1 p. 7 p. 9 p. 11, paragraph 2.6; table 1.
Chujoh T., et al., "Specification and experimental results of quadtree-based adaptive loop filter", 37. VCEG meeting, Apr. 15, 2009, XP002675788, Yokohama Retrieved from the Internet: URL:http://wftp3.itu.int/av-arch/video-site/0904_Yok/VCEG-AK22.zip [retrieved on May 11, 2012] paragraph [02.1]-paragraph [0003].
International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.
Karczewicz M., et al., "Adaptive Filter Based on Combination of Sum-Modified Laplacian Filter Indexing and Quadtree Partitioning", 38. VCEG Meeting; 89, MPEG Meeting; Jan. 7, 2009-Aug. 7, 2009; London,Geneva; (Video Coding Experts Group of ITU-T SG. 16), No. VCEG-AL27, Jul. 3, 2009, XP030003708, ISSN: 0000-0084 p. 1.
Karczewicz M., et al., "Video coding technology proposal by Qualcomm", 1. JCT-VC Meeting; Apr. 15, 2010-Apr. 23, 2010; Dresden; (Joint Collaborative Team on Video Coding of ISO/IEC JTC1/SC29/WG11 and ITU-TSG.16); URL: http://wftp3.itu.int/av-arch/JCTVC-Site/, No. XP030007566, May 18, 2010, XP030007567, ISSN: 0000-0049 p. 1 p. 12-p. 13.
Lai, et al., "CE8 Subtest 1: Block-based filter adaptation with features on subset of pixels," Joint Collaborative Team on Video Coding (JCT-VC) of ITU-T SG16 WP3 and ISO/IEC JTC1/SC29/WG11, 6th Meeting: Torino, Italy, Jul. 14-22, 2011, Document JCTVC-F301.
Tsai C. Y., et al., "TE10 subtest 2: Coding unit synchronous picture quadtree-based adaptive loop filter (QALF)", 94. MPEG Meeting; Oct. 11, 2010-Oct. 15, 2010; Guangzhou; (Motion Picture Expert Group or ISO/IECJTC1/SC29/WG11),, No. M18169, Oct. 28 2010, XP030046759, p. 1 p. 2, paragraph 2.1-p. 4, paragraph 2.2 p. 7; table 2.
U.S. Appl. No. 13/401,548, by In Suk Chong, filed Feb. 21, 2012.
U.S. Appl. No. 13/401,552, by In Suk Chong, filed Feb. 21, 2012.
U.S. Appl. No. 13/401,573, by In Suk Chong, filed Feb. 21, 2012.
U.S. Appl. No. 13/401,685, by In Suk Chong, filed Feb. 21, 2012.
Wiegand T et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wiegand et al., "WD3: Working Draft 3 of High-Efficiency Video Coding," Document JCTVC-E603, 5th Meeting: Geneva, CH, Mar. 16-23, 2011,193 pp.
Wiegand T. et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].
Gonzales, R.C., et al., "Digital Image Processing, Chapter 10: Image Segmentation", Jan. 1, 2008, Digital Image Processing, Pearson Education, Inc, New Jersey, pp. 719-727, XP002669229, ISBN: 978-0-13-505267-9.
Gonzales, R.F., et al., "Digital Image processing", Digital Image Processing, XX, XX, Jan. 1, 1992, pp. 189-201, XP002955339.
Gonzalez, R.C., et al., "Digital Image Processing, Image Enhancement in the Spatial Domain", Jan. 1, 2002, Digital Image Processing, Prentice-Hall, Upper Saddle River, New Jersey, pp. 128-134, XP001152050, ISBN: 978-0-201-18075-6.
Jahne B., Digital Image Processing, Springer-Verlag Berlin Heidelberg, 2005, 6th Edition.
Taiwan Search Report—TW099101168—TIPO—Dec. 19, 2012.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, Usa, Feb. 1-10, 2012, 259 pp.
Jahne, B., "Digital image processing," Technosphera, Moscow, 2007, pp. 331-338 (English version: 6th edition of B. Jahne, Digital image processing, Springer-Verlag Berlin Heidelberg, 2005, pp. 331-338).
List P., et al.,"Adaptive deblocking filter", IEEE Transactions on Circuits and Systems for Video Technology, IEEE Service Center, Piscataway, NJ, US, vol. 13, No. 7, Jul. 7, 2003, pp. 614-619, XP011221094.
Shin S.H., et al., "Variable Block-Based Deblocking Filter for H.264/AVC on Low-end and Low-bit Rates Terminals", Signal Processing: Image Communication, vol. 25, Issue 4, Apr. 2010, pp. 255-267.
Wedi T., "Adaptive Interpolation Filter for Motion Compensated Prediction", Proc. IEEE International Conference on Image Processing (ICIP), New York, vol. 2, Sep. 2002, pp. II-509-II-512.
Bross, B., et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pages.
Bross, et al., "High Efficiency Video Coding (HEVC) text specification draft 9," Joint Collaborative Team on Video Coding (JCT-VC) of ITU-T SG16 WP3 and ISO/IEC JTC1/SC29NVG11, JCTVC-K1003—v7, 11th Meeting: Shanghai, CN, Oct. 10-19, 2012, 290 pages.
Chong I. S., et al., "CE8 Subtest 2: Block based adaptive loop filter (ALF)," Joint Collaborative Team on Video Coding (JCT-VC) of ITU-T SG16 WP3 and ISO/IEC JTC1/SC29NVG11, 5th Meeting: Geneva, CH, Mar., 2011, JCTVCC-E323_r3, pp. 1-5.
Ikai et al., "CE8.2: Region-Based Adaptive Loop Filter using Two-Dimensional Feature", Joint Collaborative Team on Video Coding (JCT-VC) of ITU-T SG16 WP3 and ISO/IEC JTC1/SC291WG11, 5th Meeting: Geneva, Switzerland, Mar., 2011, JCTVC-E141, pp. 1-7.
Ikai T., et al., "CE8.1:Block based Adaptive Loop Filter with flexible syntax and additional BA mode by Sharp and Qualcomm," Joint

(56) References Cited

OTHER PUBLICATIONS

Collaborative Team on Video Coding (JCT-VC) of ITU-T SG16 WP3 and ISO/IEC JTC1/SC29/ WG11, 6th Meeting: Torino, IT, Jul., 2011, JCTVC-F384r2, pp. 1-6.

ITU-T H.265, Series H: Audiovisual and Multimedia Systems, Infrastructure of audiovisual services—Coding of moving video, High efficiency video coding, The International Telecommunication Union, Apr. 2013, 317 pages.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pages.

Karczewicz M., et al., "Video Coding Technology Proposal by Qualcomm Inc.," JCTVC-A121, Joint Collaborative Team on Video Coding(JCT-VC) of ITU-T SG16 WP3 and ISO/IEC JTC1/SC29/WG11, 1st Meeting: Dresden, DE, Apr. 15-23, 2010, 2 pages.

\* cited by examiner

FILTER PREDICTION BASED ON ACTIVITY METRICS IN VIDEO CODING

This application claims the benefit of U.S. Provisional Application No. 61/144,873, filed on Jan. 15, 2009, and U.S. Provisional Application No. 61/178,346, filed on May 14, 2009, the entire contents of which are incorporated herein by reference.

TECHNICAL FIELD

This disclosure relates to block-based digital video coding used to compress video data and, more particularly, techniques for coding filter coefficients associated with the filtering of video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or ITU-T H.264/MPEG-4, Part 10, Advanced Video Coding (AVC), to transmit and receive digital video more efficiently. Video compression techniques perform spatial and temporal prediction to reduce or remove redundancy inherent in video sequences.

Block-based video compression techniques may perform spatial prediction and/or temporal prediction. Intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that can be used to create or identify a predictive block, and a residual block of data indicative of differences between the block being coded and the predictive block. In the case of inter-coding, one or more motion vectors are used to identify the predictive block of data from a previous or subsequent coded unit, while in the case of intra-coding, the prediction mode can be used to generate the predictive block based on data within the coded unit associated with the video block being coded. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise discrete cosine transforms (DCTs) or conceptually similar processes, such as wavelet transforms, integer transforms, or other types of transforms. In a discrete cosine transform process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

Filtering of video blocks may be applied as part of the encoding and decoding loops, or as part of a post-filtering process on reconstructed video blocks. Filtering is commonly used, for example, to reduce blockiness or other artifacts common to block-based video coding. Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

SUMMARY

This disclosure describes techniques associated with filtering of video data in a video encoding and/or decoding process. In accordance with this disclosure, one or more filters are applied at an encoder, and filter information is encoded in the bitstream to identify the filter(s) that were applied at the encoder. The decoder receives encoded video data that includes the filter information, decodes the video data, and applies one or more filters based on the filtering information encoded in the bitstream. Different types of filters may be applied based on an activity metric determined for the video data. Moreover, in accordance with this disclosure, the manner in which the filter information is encoded into the bitstream may be dependent on the activity metric.

For example, different filters may be defined for a coded unit based on different values of an activity metric associated with pixels of the coded unit. Different filters may be applied to pixel data that falls into different ranges of the activity metric. Moreover, the encoding of the filters is also dependent upon the activity metric. For a first range of the activity metric, one or more filters are coded directly into the filter information. In this case, for example, the values of filter coefficients may be encoded into the bitstream without using any predictive encoding techniques. However, for a second range of the activity metric, one or more filters are predictively coded into the filter information. In this case, the values of filter coefficients may be defined by residual values or differences relative to the filter coefficients defined for another coded unit. By using direct encoding without any prediction to encode one or more filters for a first range of an activity metric, and using predictive encoding to encode one or more filters for a second range of the activity metric, improved data compression may be achieved. The different filters may be identical, with the exception that the different filters use the different filter coefficients. Alternatively, different filters may include different numbers of coefficients, or may define different filter supports.

In one example, this disclosure describes method of coding video data. The method comprises coding pixel data of a coded unit of the video data, and coding filter information associated with a filtering process on the pixel data, wherein the filter information comprises different filters defined for the coded unit based on different values of an activity metric, wherein for a first range of the activity metric one or more filters of the are encoded directly into the filter information and for a second range of the activity metric one or more of the filters are predictively encoded into the filter information. In this disclosure, the term "coding" refers to either encoding or decoding.

In another example, this disclosure describes an apparatus that codes (e.g., encodes or decodes) video data. The apparatus comprises a video coder that codes pixel data of a coded unit of the video data, and codes filter information associated with a filtering process on the pixel data, wherein the filter information comprises different filters defined for the coded unit based on different values of an activity metric, wherein for a first range of the activity metric one or more filters of the are encoded directly into the filter information and for a second range of the activity metric one or more filters of the are predictively encoded into the filter information.

In another example, this disclosure describes a device that codes video data, the device comprising means for coding pixel data of a coded unit of the video data, and means for coding filter information associated with a filtering process on the pixel data, wherein the filter information comprises different filters defined for the coded unit based on different values of an activity metric, wherein for a first range of the activity metric one or more of the filters are encoded directly into the filter information and for a second range of the activity metric one or more of the filters are predictively encoded into the filter information.

The techniques described in this disclosure may be implemented in hardware, software, firmware, or any combination thereof If implemented in hardware, an apparatus may be realized as an integrated circuit, a processor, discrete logic, or any combination thereof If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution in a processor cause the processor to code pixel data of a coded unit of the video data, and code filter information associated with a filtering process on the pixel data, wherein the filter information comprises different filters defined for the coded unit based on different values of an activity metric, wherein for a first range of the activity metric one or more of the filters are encoded directly into the filter information and for a second range of the activity metric one or more of the filters are predictively encoded into the filter information.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
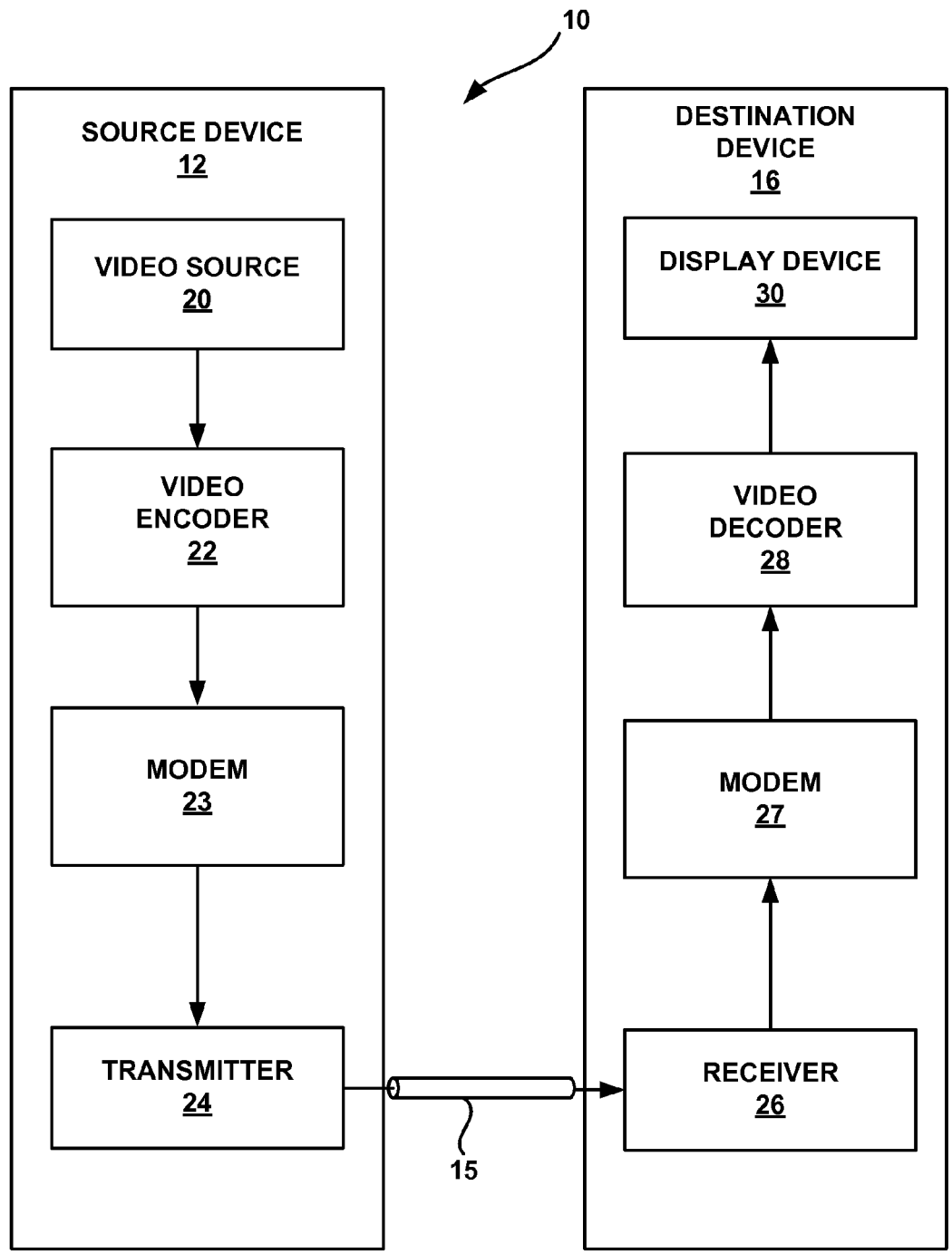
FIG. 1 is an exemplary block diagram illustrating an exemplary video encoding and decoding system.

This disclosure describes techniques associated with filtering of video data in a video encoding and/or video decoding process. In accordance with this disclosure, filtering is applied at an encoder, and filter information is encoded in the bitstream to identify the filtering that was applied at the encoder. The decoder receives encoded video data that includes the filter information, decodes the video data, and applies filtering based on the filtering information. In this way, the decoder applies the same filtering that was applied at the encoder.

Different types of filtering may be applied based on an activity metric determined for the video data. The activity metric may quantify activity associated with one or more blocks of pixels within the video data. The activity metric may comprise a variance metric indicative of pixel variance within a set of pixels. For example, the activity metric may comprise a sum-modified Laplacian function value, as explained in greater detail below. In any case, in accordance with this disclosure, the manner in which the filter information is encoded (and decoded) may be dependent on the activity metric. For example, in accordance with this disclosure, different filters are defined for a coded unit based on different values of an activity metric associated with pixels of the coded unit.

For a first range of the activity metric, one or more filters are coded directly into the filter information. In this case, for example, the values of filter coefficients may be encoded directly into the bitstream without using any predictive encoding techniques. However, for a second range of the activity metric one or more filters are predictively coded into the filter information. In this case, the values of filter coefficients may be defined by residual values or differences relative to the filter coefficients defined for another coded unit. Predictively coded filter information may include first data that identifies a different encoded filter, e.g., by identifying a different coded unit. In addition, the predictively coded filter information may also include second data that represents the differences between current filter coefficients being coded and the filter coefficients of the different filter that is identified by the first data.

By using direct encoding without any prediction to encode one or more filters for a first range of an activity metric, and using predictive encoding to encode one or more filters for a second range of the activity metric, improved data compression may be achieved. In this case, the way in which filters are encoded and decoded is made dependent on the activity metric. Moreover, the filter selection itself may also be dependent upon the activity metric. Thus, the activity metric may determine the filtering that is applied to pixels of a coded unit, and may also define or affect the manner in which filter information is encoded into a bitstream and decoded from the bitstream.

The techniques of this disclosure may apply to in-loop filtering or post filtering. In-loop filtering refers to filtering in which the filtered data is part of the encoding and decoding loops such that filtered data is used for predictive intra- or inter-coding. Post filtering refers to filtering that is applied to reconstructed video data after the encoding loop. With post filtering, the unfiltered data is used for predictive intra- or inter-coding. The techniques of this disclosure are not limited to in-loop filtering or post filtering, and may apply to a wide range of filtering applied during video coding.

In this disclosure, the term "coding" refers to encoding or decoding. Similarly, term "coder" generally refers to any video encoder, video decoder, or combined encoder/decoder (codec). Accordingly, the term "coder" is used herein to refer to a specialized computer device or apparatus that performs video encoding or video decoding.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply more generally to filtering of video data and the coding of filter information, are not necessarily limited to wireless applications or settings, and may be applied to non-wireless devices including video encoding and/or decoding capabilities.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to select filter coefficients for a video block filtering process based on an activity metric associated with pixels of the video block, and then encode the selected filter coefficients based on the activity metric. Specifically, for a first range of the activity metric, filter coefficients are encoded directly, and for a second range of the activity metric, the filter coefficients are predictively coded.

The encoded bitstream may include signaling syntax elements to define whether or not each given set of filter coefficients is predictively encoded or directly encoded. For each range of the activity metric considered at the encoder, for example, the bitstream may include a corresponding bit that indicates whether direct or predictive coding was used to encode the filter coefficients to be used in that range. Therefore, the decoder can decode the filter coefficients properly by applying predictive or direct decoding as defined by the signaling syntax elements. Furthermore, the decoder may also compute the activity metric based on decoded pixel values, and thereby determine whether the activity metric falls in the first range or the second range. In this way, the decoder can determine which filter to apply to different pixel data based on the activity metric.

More specifically, video encoder 22 of source device 12 may select filter coefficients, apply such filter coefficients during the encoding process, and then encode the filter coefficients for communication to video decoder 28 of destination device 16. Video encoder 22 may determine an activity metric associated with pixels being coded in order to both select the filter coefficients and to determine how to encode the filter coefficients. On the decoder side, video decoder 28 of destination device 16 also determines the activity metric associated with pixels so that video decoder 28 can determine the filter coefficients to apply to pixel data. Video decoder 28 may decode the filter coefficients based on direct decoding or predictive decoding depending upon how the filter coefficients were encoded, which may be signaled as part of the bitstream syntax. The illustrated system 10 of FIG. 1 is merely exemplary. The filtering techniques of this disclosure may be performed by any encoding or decoding devices. Source device 12 and destination device 16 are merely examples of coding devices that can support such techniques.

Video encoder 22 of source device 12 may encode video data received from video source 20 using the techniques of this disclosure. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA) or another communication standard or technique, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. The video decoding process performed by video decoder 28 may include filtering, e.g., as part of the in-loop decoding or as a post filtering step following the decoding loop. Either way, the filter coefficients applied by video decoder 28 may be decoded using the techniques of this disclosure. When predictive coding is used for filter coefficients, similarities between different filter coefficients may be exploited to reduce the amount of information conveyed over channel 15. In particular, a set of the filter coefficients can be predictively coded as difference values relative to another set of the filter coefficients associated with a different coded unit. In this case, video decoder 28 receives an encoded bitstream comprising video blocks and filter information that identifies the different coded unit (to identify an associated filter). The filter information also includes difference values that define the current filter relative to the filter of the different coded unit. In particular, the difference values may comprise filter coefficient difference values that define filter coefficients for the current filter relative to filter coefficients of a different filter used for a different coded unit.

Video decoder 28 decodes the video blocks, generates the filter coefficients, and filters the decoded video blocks based on the generated filter coefficients. The decoded and filtered video blocks can be assembled into video frames to form decoded video data. Display device 28 displays the decoded video data to a user, and may comprise any of a variety of display devices such as a cathode ray tube (CRT), a liquid crystal display (LCD), a plasma display, an organic light emitting diode (OLED) display, or another type of display device.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard such as the ITU-T H.264 standard, alternatively referred to as MPEG-4, Part 10, Advanced Video Coding (AVC). However, the techniques of this disclosure may be readily applied to any of a variety of other video coding standards. Specifically, any standard that allows for filtering at the encoder and decoder may benefit from the teaching of this disclosure by reducing the amount of data needed to communicate filter information from the encoder to the decoder.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or steps. In general, video encoder 22 operates on video blocks within individual video frames (or other independently coded units such as slices) in order to encode the video blocks. Frames, slices, portions of frames, groups of pictures (GOPs), or other data structures may be defined as independently decodable units that include a plurality of video blocks. In some cases, each video frame may include a series of independently decodable slices, and each slice may include a series of macroblocks, which may be arranged into even smaller blocks. The term "coded unit" refers to frames, slices, portions of frames, groups of pictures (GOPs), or other data structures that are independently decodable. The video blocks within coded units may have fixed or varying sizes, and may differ in size according to a specified coding standard. Syntax data may be defined on a per-coded-unit basis such that each coded unit includes associated syntax data. The filter information described herein may be part of such syntax for the coded units, and can indicate the filer coefficients for the coded unit or possibly other characteristics of the filter (e.g., filter type) that was used to filter the pixel data of the coded unit. The filter type, for example, may be linear, bilinear, two-dimensional, bicubic, or may generally define any shape of filter support. Sometimes, the filter type may be presumed by the encoder and decoder, in which case the filter type is not included in the bitstream, but in other cases, filter type may be encoded along with filter coefficient information as described herein. The syntax data may also signal to the decoder how the filters were encoded (e.g., how the filter coefficients were encoded), as well as the ranges of the activity metric for which the different filters should be used. A bit may be included for range of the activity metric to define whether predictive or direct decoding should be used.

Macroblocks typically refer to 16 by 16 blocks of data. The ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. In this disclosure, the phrase "video blocks" refers to any size of video block. Moreover, video blocks may refer to blocks of video data in the pixel domain, or blocks of data in a transform domain such as a discrete cosine transform (DCT) domain, a domain similar to DCT, a wavelet domain, or the like.

Video encoder 22 may perform predictive coding in which a video block being coded is compared to a predictive frame (or other coded unit) in order to identify a predictive block. The differences between the current video block being coded and the predictive block are coded as a residual block, and prediction syntax is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values into transform coefficients, which may represent the energy of the pixel values in the frequency domain. Quantization is typically applied to the transform coefficients, and generally involves a process that limits the number of bits associated with any given transform coefficient.

Following transform and quantization, entropy coding may be performed on the quantized and transformed residual video blocks. Syntax elements, such as the filter information and prediction vectors defined during the encoding, may also be included in the entropy coded bitstream for each coded unit. In general, entropy coding comprises one or more processes that collectively compress a sequence of quantized transform coefficients and/or other syntax information. Scanning techniques, such as zig-zag scanning techniques, are performed on the quantized transform coefficients, e.g., as part of the entropy coding process, in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data used for subsequent prediction-based coding of subsequent video blocks. At this stage, filtering may be employed in order to improve video quality, and e.g., remove blockiness artifacts from decoded video. The filtered data may be used for prediction of other video blocks, in which case the filtering is referred to as "in-loop" filtering. Alternatively, prediction of other video blocks may be based on unfiltered data, in which case the filtering is referred to as "post filtering."

The encoder may select filter coefficients in a manner that promotes the video quality. Such filter coefficients may be selected from pre-defined sets of coefficients, or may be adaptively defined to promote video quality. As an example, video encoder 22 may select or define several sets of filter coefficients for a given coded unit such that the different sets of filter coefficients are used for different pixels of the video blocks of that coded unit. In particular, several sets of filter coefficients may be defined for each coded unit, and the activity associated with the pixels of the coded unit may define the filter coefficients to use on such pixels. In some cases, video encoder 22 may apply several sets of filter coefficients and select one or more sets that produce the best quality video in terms of amount of distortion between coded block and original block, and/or the highest levels of compression. In any case, once selected, the set of filter coefficients applied by video encoder 22 for each coded unit may be encoded and communicated to video decoder 28 of destination device 18 so that video decoder 28 can apply the same filtering that was applied during the encoding process for each given coded unit.

The techniques of this disclosure specifically apply to the selection and encoding of filter coefficients. In particular, as mentioned, an activity metric may be used to define the filter coefficients as well as the manner in which the filter coefficients are encoded (e.g., either directly or predictively). The activity metric may be defined for a coded unit, or different activity metrics may be defined for different portions (e.g., sub-blocks of pixels) within a coded unit. Additional details of an exemplary activity metric are outlined in greater detail below.

Figure 2:
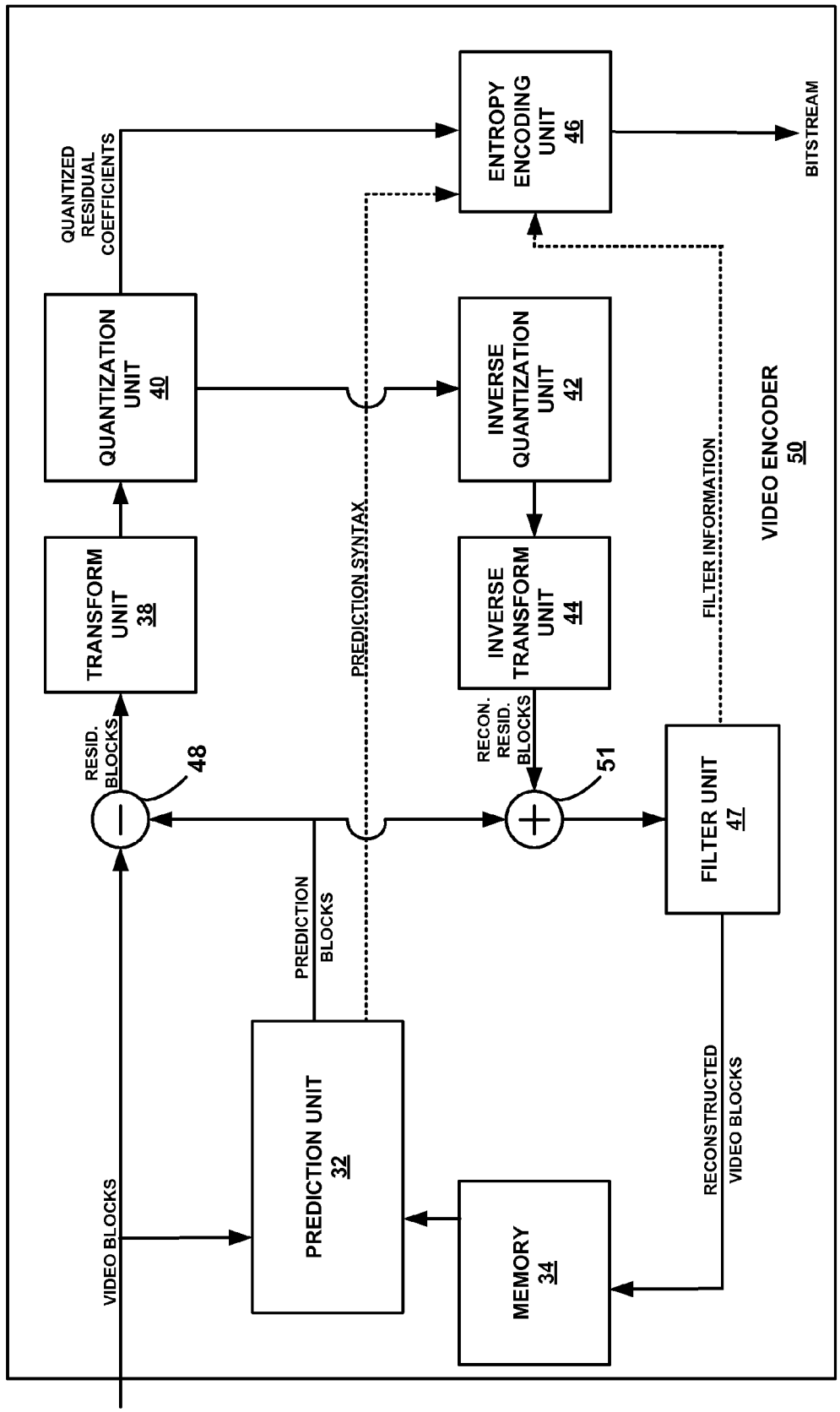
FIG. 2 is a block diagram illustrating an exemplary video encoder consistent with this disclosure.

FIG. 2 is a block diagram illustrating a video encoder 50 consistent with this disclosure. Video encoder 50 may correspond to video encoder 22 of device 20, or a video encoder of a different device. As shown in FIG. 2, video encoder 50 includes a prediction unit 32, adders 48 and 51, and a memory 34. Video encoder 50 also includes a transform unit 38 and a quantization unit 40, as well as an inverse quantization unit 42 and an inverse transform unit 44. Video encoder 50 also includes a scan unit 45 and an entropy coding unit 46. Filter unit 47 of video encoder 50 may perform filtering, and may encode filter information according to this disclosure so that the filter information can be efficiently communicated to another device.

During the encoding process, video encoder 50 receives a video block to be coded, and prediction unit 32 performs predictive coding techniques. For inter coding, prediction unit 32 compares the video block to be encoded to various blocks in one or more video reference frames or slices in order to define a predictive block. For intra coding, prediction unit 32 generates a predictive block based on neighboring data within the same coded unit. Prediction unit 32 outputs the prediction block and adder 48 subtracts the prediction block from the video block being coded in order to generate a residual block.

For inter coding, prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction unit 32 generates a predictive block based on neighboring data within the same coded unit. One or more intra-prediction modes may define how an intra prediction block can be defined.

After prediction unit 32 outputs the prediction block and adder 48 subtracts the prediction block from the video block being coded in order to generate a residual block, transform unit 38 applies a transform to the residual block. The transform may comprise a discrete cosine transform (DCT) or a conceptually similar transform such as that defined by the H.264 standard. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 then quantizes the residual transform coefficients to further reduce bit rate. Quantization unit 40, for example, may limit the number of bits used to code each of the coefficients. After quantization, entropy coding unit 46 scans the quantized coefficient block from a two-dimensional representation to one or more serialized one-dimensional vectors. The scan order may be pre-programmed to occur in a defined order (such as zig-zag scanning or another pre-defined order), or possibly adaptive defined based on previous coding statistics.

Following this scanning process, entropy encoding unit 46 encodes the quantized transform coefficients (along with any syntax elements) according to an entropy coding methodology, such as CAVLC or CABAC, to further compress the data. Syntax elements included in the entropy coded bitstream may include prediction syntax from prediction unit 32, such as motion vectors for inter coding or prediction modes for intra coding. Syntax elements included in the entropy coded bitstream may also include filter information from filter unit 47, which can be encoded in the manner described herein.

CAVLC is one type of entropy coding technique supported by the ITU H.264/MPEG4, AVC standard, which may be applied on a vectorized basis by entropy coding unit 46. CAVLC uses variable length coding (VLC) tables in a manner that effectively compresses serialized "runs" of transform coefficients and/or syntax elements. CABAC is another type of entropy coding technique supported by the ITU H.264/MPEG4, AVC standard, which may be applied on a vectorized basis by entropy coding unit 46. CABAC may involve several stages, including binarization, context model selection, and binary arithmetic coding. In this case, entropy coding unit 46 codes transform coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. Again, the encoded video may comprise the entropy coded vectors and various syntax, which can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction unit 32 to produce a reconstructed video block for storage in memory 34. Prior to such storage, however, filter unit 47 may apply filtering on the video block to improve video quality. Such filtering by filter unit 47 may reduce blockiness or other artifacts. In some cases, filter unit 47 may be referred to as a deblocking filter unit. Moreover, filtering may improve compression by generating predictive video blocks that more closely match video blocks being coded than unfiltered predictive video blocks. After filtering, the reconstructed video block may be used by prediction unit 32 as a reference block to inter-code a block in a subsequent video frame or other coded unit. Although filter unit 47 is shown "in-loop," the techniques of this disclosure could also be used with post filters, in which case non-filtered data (rather than filtered data) would be used for purposes of predicting data in subsequent coded units.

Filter unit 47 may perform filter coefficient selection in a manner that promotes the video quality. For example, filter unit 47 may select filter coefficients from pre-defined sets of coefficients, or may adaptively define the filter coefficients in order to promote video quality or improved compression. Filter unit 47 may select or define one or more sets set of filter coefficients for a given coded unit such that the same sets of filter coefficients are used for pixels of different video blocks of that coded unit. In some cases, filter unit 47 may apply several sets of filter coefficients and select the sets that produce the best quality video or the highest levels of compression. In any case, once selected, the set (or sets) of filter coefficients applied by filter unit 47 for each coded unit may need to be encoded and communicated to a decoding device.

According to this disclosure, filter unit 47 may select the filter coefficients based on an activity metric that quantifies activity associated with one or more sets of pixels within the coded unit. In this way, the filtering that is applied by filter unit 47 is defined by the activity associated with the pixels of the coded unit. Activity may be indicated in terms of pixel value variance within a coded unit. More variance in the pixel values in the coded unit may indicate higher levels of pixel activity, while less variance in the pixel values may indicate lower levels of pixel activity. Different filter coefficients may result in better filtering (e.g., higher image quality) depending on the level of pixel variance, i.e., activity. The pixel variance may be quantified by an activity metric, which may comprise a sum-modified Laplacian value as discussed in greater detail below. However, other types of activity metrics may also be used.

In accordance with this disclosure, filter unit 47 performs coding techniques with respect to filter information that may reduce the amount of data needed to encode and convey filter information from encoder 50 to another device. Again, for each coded unit (such as a frame, a group of pictures (GOP), a slice or other coded unit), filter unit 37 may define or select one or more sets of filter coefficients to be applied to the pixels of that coded unit. Filter unit 47 applies the filter coefficients in order to filter video blocks of reconstructed video frames stored in memory 34, which may be used for predictive coding consistent with in-loop filtering. Filter unit 47 can encode the filter coefficients as filter information, which is forwarded to entropy coding unit 46 for inclusion in the encoded bitstream.

The techniques of this disclosure recognize and exploit the fact that some of the filter coefficients defined or selected by filter unit 47 may be very similar to other filter coefficients applied with respect to the pixels of another coded unit. The same type of filter may be applied for different coding units (e.g., the same filter support), but the filters may be different in terms of filter coefficient values associated with the different indices of the filter support. Accordingly, in order to reduce the amount of data needed to convey such filter coefficients, filter unit 47 may predictively encode one or more filter coefficients to be used for filtering based on the filter coefficients of another coded unit, exploiting any similarities between the filter coefficients. In some cases, however, it may be more desirable to encode the filter coefficients directly, e.g., without using any prediction. This disclosure exploits the use of an activity metric to define when to encode the filter coefficients using predictive coding techniques and when to encode the filter coefficients directly without any predictive coding.

For a first range of the activity metric, filter unit 47 encodes one or more filters directly into the filter information. In this case, for example, the values of filter coefficients may be encoded directly into the bitstream without using any predictive encoding techniques. However, for a second range of the activity metric filter unit 47 predictively encodes one or more filters into the filter information. In this case, the values of filter coefficients may be defined by residual values or differences relative to the filter coefficients defined for another coded unit. As mentioned above, predictively coded filter information may include first data that identifies a different encoded filter, e.g., by identifying a different coded unit, and the predictively coded filter information may also include second data that represents the differences between current filter coefficients being coded and the filter coefficients of the different filter that is identified by the first data.

For example, if a set of filter coefficients comprise (5, −2, 10, 10, −2, 5) for a six element filter support in either the vertical or horizontal dimension, the direct encoding of these filter coefficients would encode each value, e.g., 5, −2, 10, 10, −2 and 5. For predictive coding, however, filter unit 47 may identify a previous coded unit that, e.g., defined a previous set of filter coefficients (6, −2, 12, 12, −2, 6). In this case, by identifying the previous set of filter coefficients (6, −2, 12, 12, −2, 6), the current set of filter coefficients (5, −2, 10, 10, −2, 5) may be encoded as difference values (1, 0, 2, 2, 0, 1). In this way, predictive coding may reduce the amount of data needed to convey the filter coefficients. In this example, the set of coefficients (5, −2, 10, 10, −2, 5) may comprise symmetric filter taps such that three neighboring pixels in one dimension are filtered based on coefficients 10, −2 and 5 respectively, and three pixels in the other dimension are also filtered based on coefficients 10, −2 and 5 respectively. In this case, coefficients 10 and 10 are used for the immediately adjacent pixels to the current pixel, coefficients −2 and −2 are used for the next pixels that two integer positions from the current pixel, and coefficients 5 and 5 are used for the next pixels that three integer positions from the current pixel.

Symmetry may also be imposed so that a subset of coefficients (e.g., 5, −2, 10) are known by the decoder to define the full set (5, −2, 10, 10, −2, 5). Symmetry may be imposed in both the direct and the predictive coding scenarios.

By using direct encoding without any prediction to encode one or more filters for a first range of an activity metric, and using predictive encoding to encode one or more filters for a second range of the activity metric, improved data compression may be achieved. In this case, the manner in which filters are encoded and decoded is made dependent on the activity metric. Moreover, as noted, the filter selection itself may also be dependent upon the activity metric. Thus, the activity metric may determine the filtering that is applied to pixels of a coded unit, and may also define or affect the manner in which filter information is encoded into a bitstream and decoded from the bitstream. The encoded filter information may include signaling syntax that signals to the decoder the manner of encoding used for any given set of coefficients, as well as the activity metric ranges for which any given set of coefficients should be used. The decoder may decode and apply the filter coefficients in compliance with this signaling syntax.

Figure 3:
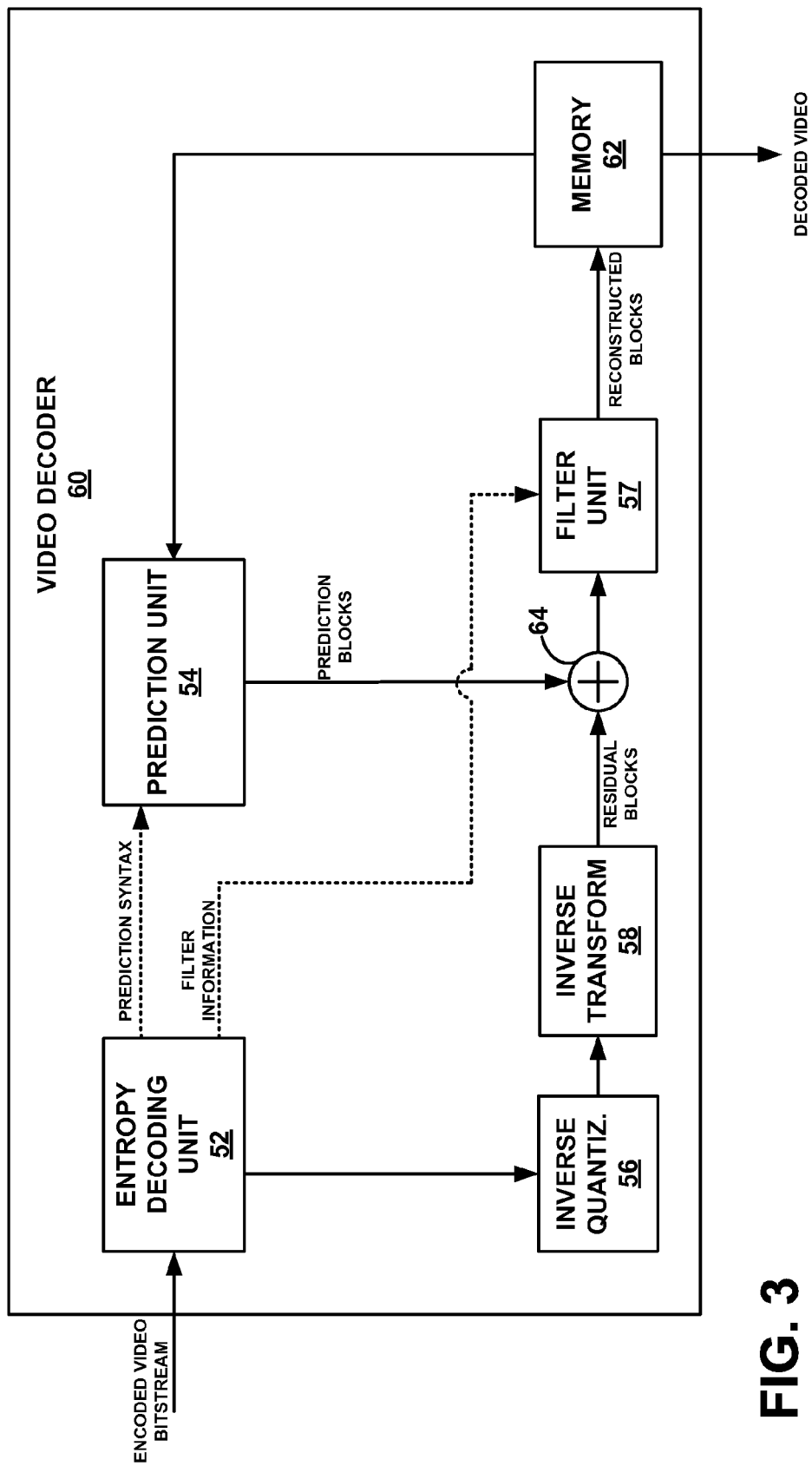
FIG. 3 is a block diagram illustrating an exemplary video decoder consistent with this disclosure.

FIG. 3 is a block diagram illustrating an example of a video decoder 60, which decodes a video sequence that is encoded in the manner described herein. The received video sequence may comprise an encoded set of image fames, a set of frame slices, a commonly coded group of pictures (GOPs), or a wide variety of coded video units that include encoded video blocks and syntax to define how to decode such video blocks.

Even macroblocks or other video blocks could be coded units in some cases, e.g., if the macroblocks are encoded as separately decodable units.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Entropy decoded video blocks in a one-dimensional serialized format may be inverse scanned to convert one or more one-dimensional vectors of coefficients back into a two-dimensional block format. The number and size of the vectors, as well as the scan order defined for the video blocks may define how the two-dimensional block is reconstructed. Entropy decoded prediction syntax may be sent from entropy decoding unit 52 to prediction unit 54, and entropy decoded filter information may be sent from entropy decoding unit 52 to filter unit 57.

Video decoder 60 also includes a prediction unit 54, an inverse quantization unit 56, an inverse transform unit 58, a memory and a summer 64. In addition, video decoder 60 also includes a filter unit 57 that filters the output of summer 64. Consistent with this disclosure, filter unit 57 may receive entropy decoded filter information that includes one or more filters to be applied. The filters may be defined by sets of filter coefficients. Filter unit 57 may be configured to generate the filter coefficients based on the filter information. The filter information may include signaling syntax that signals to the decoder the manner of encoding used for any given set of coefficients, as well as the activity metric ranges for which any given set of coefficients should be used. Following decoding of the filters, filter unit 57 can filter the pixel values decoded video blocks based on the one or more sets of filter coefficients and the signaling syntax that includes activity metric ranges for which the different sets of filter coefficients should be used. The activity metric ranges may be defined by a set of activity values that define the ranges of activity metrics used to define the type of encoding used (e.g., predictive or direct).

Filter unit 57 may calculate one or more activity metrics associated with the decoded pixels of a coded unit (e.g., the output of adder 51) in order to determine how to apply the filters. For a first range of the activity metric, filter unit 57 applies one or more filters that were encoded directly into the filter information. In this case, for example, the values of filter coefficients would have been encoded directly into the bitstream without using any predictive encoding techniques. However, for a second range of the activity metric, filter unit 57 applies the one or more filters that were predictively encoded in the filter information. In this case, the values of filter coefficients may have been defined by residual values or differences relative to the filter coefficients defined for another coded unit. For these coefficients, filter unit 57 may identify a different filter of a different coded unit based on the filter information, determine residual values based on the filter information, and combine the residual values with one or more different filter of the different coded unit in order to generate one or more new filters to be applied to the currently coded unit. The activity metric calculated by filter unit 57 defines which filters to apply in the decoding process. The actual decoding of filter coefficients by filter unit 57 (e.g., direct or predictive decoding) may be performed based on signaling syntax in the encoded filter information that defines how the filters were encoded.

The filter may generally assume any type of filter support shape or arrangement. The filter support refers to the shape of the filter with respect to a given pixel being filtered, and the filter coefficients may define weighting applied to neighboring pixel values according to the filter support. Sometimes, the filter type may be presumed by the encoder and decoder, in which case the filter type is not included in the bitstream, but in other cases, filter type may be encoded along with filter coefficient information as described herein. The syntax data may also signal to the decoder how the filters were encoded (e.g., how the filter coefficients were encoded), as well as the ranges of the activity metric for which the different filters should be used.

Prediction unit 54 receives prediction syntax (such as motion vectors) from entropy decoding unit 52. Using the prediction syntax, prediction unit 54 generates the prediction blocks that were used to code video blocks. Inverse quantization unit 56 performs inverse quantization, and inverse transform unit 58 performs inverse transforms to change the coefficients of the residual video blocks back to the pixel domain. Adder 64 combines each prediction block with the corresponding residual block output by inverse transform unit 58 in order to reconstruct the video block.

Filter unit 57 generates the filter coefficients to be applied for each coded unit, and then applies such filter coefficients in order to filter the reconstructed video blocks of that coded unit. The filtering, for example, may comprise deblock filtering that smoothes edges and/or eliminates artifacts associated with video blocks. The filtered video blocks are accumulated in memory 62 in order to reconstruct decoded frames (or other decodable units) of video information. The decoded units may be output from video decoder 60 for presentation to a user, but may also be stored for use in subsequent predictive decoding.

In the field of video coding, it is common to apply filtering at the encoder and decoder in order to enhance the quality of a decoded video signal. Filtering can be applied via a post-filter, in which case the filtered frame is not used for prediction of future frames. Alternatively, filtering can be applied "in-loop," in which case the filtered frame may be used to predict future frames. A desirable filter can be designed by minimizing the error between the original signal and the decoded filtered signal.

In a manner similar to the quantization of transform coefficients, the coefficients of the filter $h(k,l)$, where $k=-K, \ldots, K$, and $l=-L, \ldots, L$ may also be quantized. K and L may represent integer values. The coefficients of filter $h(k,l)$ may be quantized as:

$$f(k,l) = \text{round}(\text{normFact} \cdot h(k,l))$$

where normFact is a normalization factor and round is the rounding operation performed to achieve quantization to a desired bit-depth. Quantization of filter coefficients may be performed by filter unit 47 (FIG. 2) during the encoding, and de-quantization or inverse quantization may be performed on decoded filter coefficients by filter unit 57 (FIG. 3)

The quantized filter coefficients are encoded and sent from source device associated with encoder 60 to a destination device associated with decoder 60 as part of an encoded bitstream. In the example above, the value of normFact is usually equal to $2n$ although other values could be used Larger values of normFact lead to more precise quantization such that the quantized filter coefficients $f(k,l)$ provide better performance. However, larger values of normFact may produce coefficients $f(k,l)$ that require more bits to transmit to the decoder.

At decoder 60 the decoded filter coefficients $f(k,l)$ may be applied to the reconstructed image $R(i,j)$, where $i=0, \ldots, M$ and $j=0, \ldots, N$ as follows:

$$\tilde{R}(i, j) = \sum_{k=-K}^{K} \sum_{l=-L}^{L} f(k, l) R(i+k, j+l) \Big/ \sum_{k=-K}^{K} \sum_{l=-L}^{L} f(k, l)$$

The variables M, N, K and L may represent integers. K and L may define a block of pixels that spans two-dimensions from −K to K and from −L to L.

The techniques of this disclosure may improve the performance of a post-filter or in-loop filter, and may also reduce number of bits needed to transmit filter coefficients f(k,l). In some cases, a number of different post-filters or in-loop filters are transmitted to the decoder for each coded unit, e.g., for each frame, slice, portion of a frame, group of frames (GOP), or the like. For each filter, additional information is included in the bitstream to identify the coded units, macroblocks and/or pixels for which a given filter should be applied.

The frames may be identified by frame number and/or frame type (e.g., I-frames, P-frames or B-frames). I-frames refer to intra-frames that are intra-predicted. P-frames refer to predictive frames that have video blocks predicted based on one list of data (e.g., one previous frame). B-frames refer to bidirectional predictive frames that are predicted based on two lists of data (e.g., a previous and subsequent frame). Macroblocks can be identified by listing macroblock types and/or range of quantization parameter (QP) values use to reconstruct the macroblock.

The filter information may also indicate that only pixels for which the value of a given measure of local characteristic of an image, called an activity metric, is within specified range should be filtered with a particular filter. For example, for pixel (i,j) the activity metric may comprise a sum-modified Laplacian value calculated as follows:

$$\text{var}(i, j) =$$

$$\sum_{k=-K}^{K} \sum_{l=-L}^{L} |2R(i+k, j+l) - R(i+k-1, j+l) - R(i+k+1, j+l)| +$$

$$|2R(i+k, j+l) - R(i+k, j+l-1) - R(i+k, j+l+1)|$$

wherein k represents a value of a summation of pixel values from −K to K and l represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

Filter coefficients f(k,l) may be coded using prediction from coefficients transmitted for previous coded units. For each coded unit m (e.g., each frame, slice or GOP), the encoder may encode and transmit a set of M filters:

$g_i^m$, wherein $i=0, \ldots, M-1$.

For each filter, the bitstream may be encoded to identify a range of values of activity metric value var for which the filter should be used.

For example, filter unit 47 of encoder 50 may indicate that filter:

$g_0^m$ should be used for pixels for which activity metric value var is within interval [0, $\text{var}_0$), i.e., var≥0 and var<$\text{var}_0$. Furthermore, filter unit 47 of encoder 50 may indicate that filter:

$g_i^m$ where $i=1, \ldots, M-2$, should be used for pixels for which activity metric value var is within interval [$\text{var}_{i-1}$,$\text{var}_i$). In addition, filter unit 47 of encoder 50 may indicate that filter:

$g_{M-1}^m$ should be used for pixels for which the activity metric var when var>$\text{var}_{M-2}$.

The filter coefficients can be predicted using reconstructed filter coefficients used in a previous coded unit. The previous filter coefficients may be represented as:

$f_i^n$ where $i=0, \ldots, N-1$,

In this case, the number of the coded unit n may be used to identify one or more filters used for prediction of the current filters, and the number n may be sent to the decoder as part of the encoded bitstream. In addition, information can be encoded and transmitted to the decoder to identify values of the activity metric var for which predictive coding is used.

For example, assume that for a currently coded frame m, coefficients:

$g_r^m$ are transmitted for the activity metric values [$\text{var}_{r-1}$, $\text{var}_r$). The filter coefficients of the frame m are predicted from filter coefficients of the frame n. Assume that filter $f_s^n$ is used in frame n for pixels for which the activity metric is within an interval [$\text{vary}_{s-1}$, $\text{var}_s$) where $\text{var}_{s-1}$==$\text{var}_{r-1}$ and $\text{var}_s$>$\text{var}_r$. In this case, interval [$\text{var}_{r-1}$, $\text{var}_r$) is contained within interval [$\text{var}_{s-1}$, $\text{var}_s$). In addition, information may be transmitted to the decoder indicating that prediction of filter coefficients should be used for activity values [$\text{var}_{t-1}$, $\text{var}_t$) but not for activity values [$\text{var}_t$, $\text{var}_{t+1}$) where $\text{var}_{t-1}$==$\text{var}_{r-1}$ and $\text{var}_{t+1}$==$\text{var}_r$.

Figure 4:
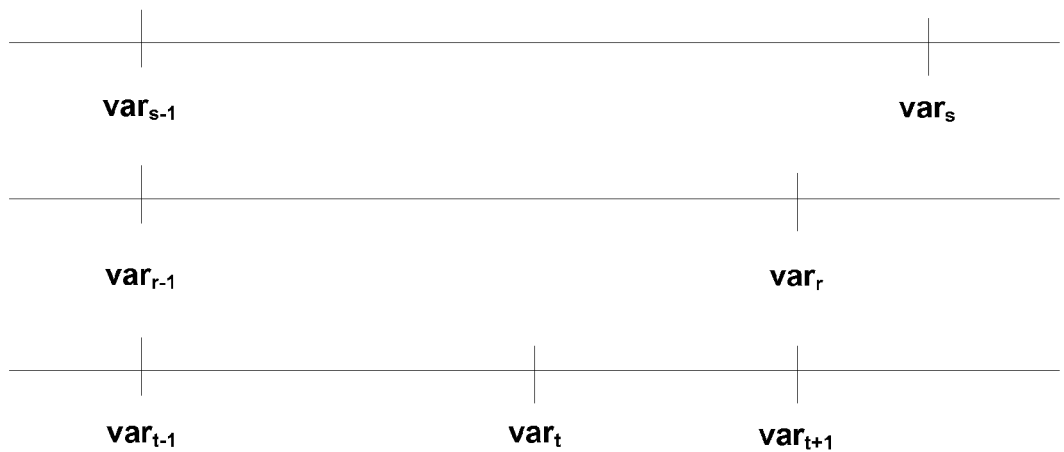
FIG. 4 is a conceptual diagram illustrating ranges of values for an activity metric.

The relationship between intervals [$\text{var}_{r-1}$−1, $\text{var}_r$), [$\text{var}_{s-1}$, $\text{var}_s$), [$\text{var}_{t-1}$, $\text{var}_t$) and [$\text{var}_t$, $\text{var}_{t+1}$) is depicted in FIG. 4. In this case, the final values of the filter coefficients:

$f_t^m$ used to filter pixels with activity metric in the interval [$\text{var}_{t-1}$, $\text{var}_t$) are equal to the sum of coefficients:

$f_s^n$ and $g_r^m$

Accordingly:

$f_t^m(k,l)=f_s^n(k,l)+g_r^m(k,l), k=-K, \ldots, K, l=-L, \ldots, L.$

In addition, filter coefficients:

$f_{t+1}^m$ that are used for pixels with activity metric [$\text{var}_t$, $\text{var}_{t+1}$) are equal to filter coefficients:

$g_r^m$.

Therefore:

$f_{t+1}^m(k,l), k=-K, \ldots, K, l=-L, \ldots, L.$

The amplitude of the filter coefficients g(k, l) depends on k and l values. Usually, the coefficient with the biggest amplitude is the coefficient g(0,0). The other coefficients which are expected to have large amplitudes are the coefficients for which value of k or l is equal to 0. This phenomenon may be utilized to further reduce amount of bits needed to transmit the coefficients. The index values k and l may define locations within a known filter support.

The coefficients:

$g_i^m(k,l), i=0, \ldots, M-1$ for each frame m may be coded using parameterized variable length codes such as Golomb or exp-Golomb codes defined according to a parameter p. By changing the value of parameter p that defines the parameterized variable length codes, these codes can be used to efficiently represent wide range of source distributions. The distribution of coefficients g(k,l) (i.e., their likelihood to have large or small values) depends on values of k and l. Hence, to increase coding efficiency, for each frame m, the value of parameter p is transmitted for each pair (k,l). The parameter p can be used for parameterized variable length coding when encoding coefficients:

$$g_i^m(k,l) \text{ where } k=-K, \ldots, K, l=-L, \ldots, L.$$

Figure 5:
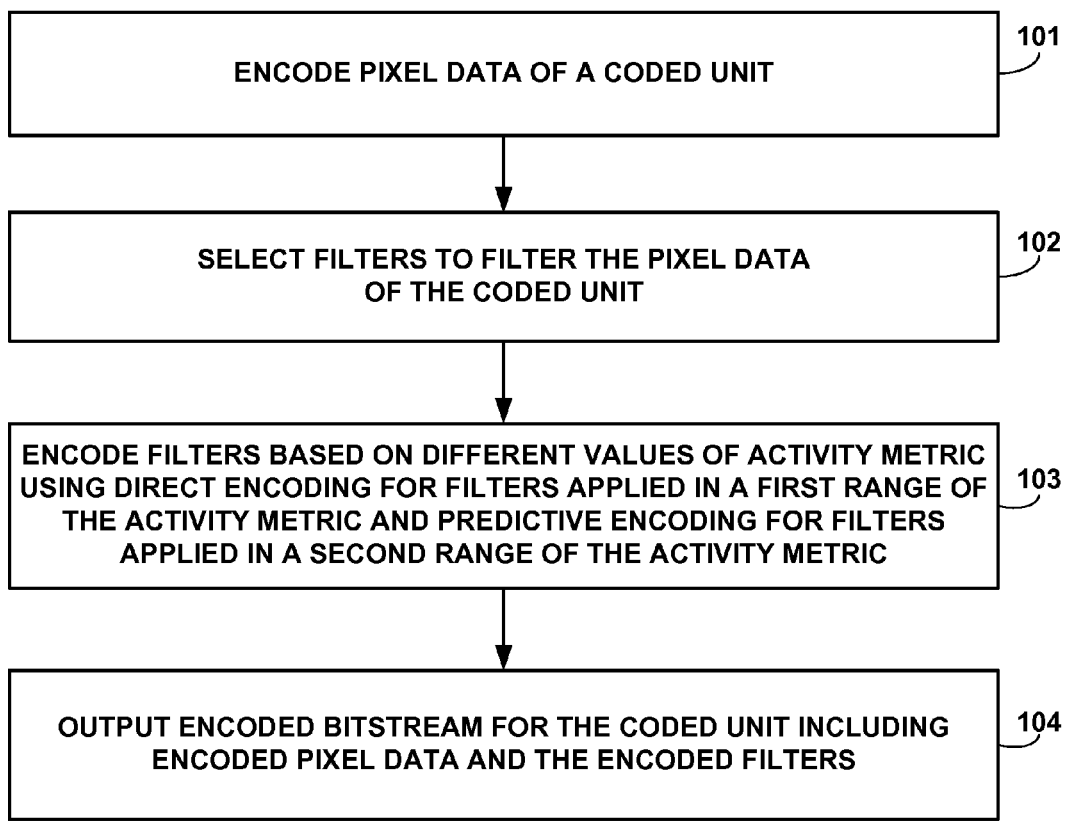
FIG. 5 is a flow diagram illustrating an encoding technique consistent with this disclosure.

FIG. 5 is a flow diagram illustrating an encoding technique consistent with this disclosure. As shown in FIG. 5, video encoder 50 encodes pixel data of a coded unit (101). The coded unit may comprise a frame, a slice, a group of pictures (GOP), or another independently decodable unit. The pixel data may be arranged in video blocks, and video encoder 50 may encode the pixel data by encoding the video blocks in accordance with a video encoding standard such as ITU-T H.264 or a similar block-based video coding standard.

As part of the video encoding process, filter unit 47 of video encoder 50 selects one or more filters to filter the pixel data of the coded unit (102). This filtering may be used to remove blockiness artifacts by smoothing edges between different blocks. Filter unit 47 is shown as being in-loop, which means that the filtered data is used for predictive encoding of later video blocks. However, filter unit 47 could alternatively apply post filtering, in which case the unfiltered data would be used for predictive encoding of later video blocks.

Filter unit 47 encodes the filters based on different values of an activity metric (103), such as the sum-modified Laplacian value explained above. In doing so, filter unit 47 uses direct encoding for filters applied in a first range of the activity metric and uses predictive encoding for filters applied in a second range of the activity metric (103). In this way, different filters may be applied by filter unit 47 to different ranges of the activity metric, and different types of encoding (direct or predictive) may be used by filter unit 47 to encode the different filters based on the activity metric. Video encoder 50 outputs an encoded bitstream for the coded unit (104), which includes encoded pixel data and the encoded filters. The encoded pixel data may be represented as entropy coded, quantized and transformed values that may be decoded at the decoder to generate the pixel values. The encoded filters may be represented by entropy coded syntax, wherein the syntax comprises directly encoded filters and/or predictively coded filters. The encoded filters may also include signaling syntax that identifies how the filters were encoded and the ranges of the activity metric for which the different filters should be applied.

The different filters may be defined by different sets of filter coefficients applied for varying size of two-dimensional filter support. For a first range of the activity metric one or more of the sets of filter coefficients are coded directly into the filter information and for the second range of the activity metric one or more of the sets of filter coefficients are predictively coded into the filter information. Alternatively, different filter types and different sets of filter coefficients may be defined for a given filter, wherein for the first range of the activity metric one or more of the sets of filter coefficients are coded directly into the filter information and for the second range of the activity metric one or more of the sets of filter coefficients are predictively coded into the filter information. In some cases, the different filters may have similar numbers of filter coefficients. However, in other examples, the different filters may comprise totally different filters that define different numbers of filter coefficients and different filter supports.

The encoded filter information may include information identifying a frame number associated with a particular filter, information identifying a frame type associated with a particular filter, information identifying a video block type associated with a particular filter, and/or information identifying quantization parameters associated with a particular filter. These or other mechanisms or elements may be used to identify filters in the bitstream, especially when predictive coding is used for the filters. Also, the encoded filter information may also include signaling syntax that identifies how the filters were encoded and the ranges of the activity metric for which the different filters should be applied.

For the second range of the activity metric, the filter information may include information identifying reference data used to predict the one or more of the filter that are predictively coded. This reference data, for example, may be information that identifies a previous or subsequent filter in the bitstream, such as information that identifies a previous or subsequent coded unit. In this case, by identifying the previous or subsequent coded unit, the filter information may imply that the filter(s) used for the previous or subsequent coded unit were used for predictive coding of the current filters. Accordingly, the filter information may further include difference values indicative of differences between the current filters and the filters of the previous or subsequent coded unit. The difference values may be added to the filter coefficients defined by the reference data to generate the current filter coefficients for the current coded unit. To further improve compression of the filters, filter coefficients may be coded using parameterized variable length codes, as mentioned above.

Figure 6:
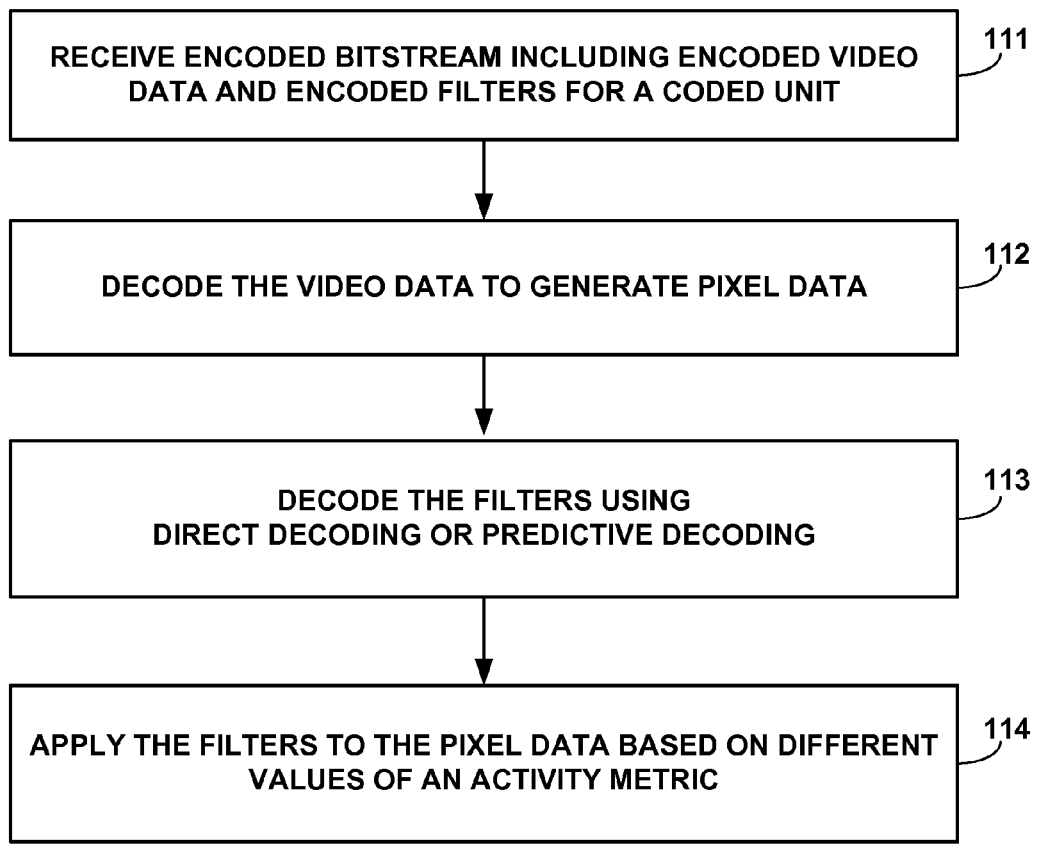
FIG. 6 is a flow diagram illustrating a decoding technique consistent with this disclosure.

FIG. 6 is a flow diagram illustrating a decoding technique consistent with this disclosure. As shown in FIG. 6, video decoder 60 receives an encoded bitstream including encoded video data and encoded filters for a coded unit (111). Video decoder 60 decodes the video data to generate pixel data (112). In particular, video decoder 60 may perform block-based video reconstruction consistent with the ITU-T H.264 video standard, or a similar block based video coding standard.

In accordance with this disclosure, video decoder 60 decodes the filters using direct decoding or predictive decoding (113). In particular, following entropy decoding by entropy decoding unit 52, encoded filter information may be sent to filter unit 57. Filter unit 57 may decode the filters using either direct decoding or predictive decoding, and the bitstream may inform filter unit 57 (e.g., via syntax information) how to properly decode the filters using either direct decoding or predictive decoding. Filter unit 57 may then selectively apply the filters based on an activity metric associated with the decoded pixel data (114). In particular, for a first range of the activity metric, a filter that was encoded directly in the bitstream may be used by filter unit 57, whereas for a second range of the activity metric, a filter that was predictively encoded in the bitstream may be used by filter unit 57.

In this manner, the filters applied by video encoder 50 based on an activity metric of pixels may be encoded into the bitstream using direct encoding or predictive encoding, depending on whether such filters are used for a first range or a second range of the activity metric. The same filters may then be applied by video decoder 60 so that the reconstructed data at the decoder matches the reconstructed data at the encoder. As explained above, by using different types of encoding for the filters based on whether such filters are used for a first range or a second range of the activity metric, improved data compression may be achieved.

The foregoing disclosure has been simplified to some extent in order to convey details. In implementation, however, there may be numerous filters per coded unit, numerous coefficients per filter, and numerous different levels of variance with each of the filters being defined for a different range of variance. For example, in some cases there may be sixteen or more filters defined for each coded unit and sixteen different ranges of variance corresponding to each filter. In this case, there still may be two larger ranges of variance (defined by an activity metric) that define whether directed encoding or predictive encoding is used for the filters. Alternatively or additionally, each variance range of the activity metric may define a corresponding bit in the bitstream that tells the decoder whether direct or predictive encoding was used.

Each of the filters may include many coefficients. In one example, the filters comprise two-dimensional filters with 81 different coefficients defined for a filter support that extends in two-dimensions. However, the number of filter coefficients that are transmitted for each filter may be fewer than 81 in some cases. Coefficient symmetry, for example, may be imposed such that filter coefficients in one dimension or quadrant may correspond to inverted or symmetric values relative to coefficients in other dimensions or quadrants. Coefficient symmetry may allow for 81 different coefficients to be represented by fewer coefficients, in which case the encoder and decoder may assume that inverted or mirrored values of coefficients define other coefficients. For example, the coefficients (5, −2, 10, 10, −2, 5) may be encoded and transmitted as the subset of coefficients (5, −2, 10). In this case, the decoder may know that these three coefficients define the larger symmetric set of coefficients (5, −2, 10, 10, −2, 5).

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of coding video data, the method comprising:
coding a unit of the video data; and
coding information for different filters associated with a filtering of pixel data of the coded unit, the different filters being defined for the coded unit based on different values of an activity metric that quantifies activity associated with one or more sets of pixels within the coded unit, the coding of the information for the different filters comprising:
directly coding, for filter information, the information of one or more of the different filters for a first range of values of the activity metric, and
predictively coding, for the filter information, the information of one or more of the different filters for a second range of values of the activity metric by using predictive filter coefficients and residual filter coefficients.

2. The method of claim 1, wherein coding the unit of the video data comprises encoding the unit of the video data into an encoded bitstream, and coding the information for the different filters comprises encoding the information for the different filters, the method further comprising outputting the filter information as part of the encoded bitstream.

3. The method of claim 1, wherein coding the unit of the video data comprises decoding the unit of the video data from an encoded bitstream, and coding the information for the different filters comprises decoding the information for the different filters, the method further comprising receiving the filter information as part of the encoded bitstream.

4. The method of claim 1, wherein the filter information is selected from the group consisting of:
information identifying a frame number associated with a particular filter,
information identifying a frame type associated with a particular filter,
information identifying a video block type associated with a particular filter,
information identifying quantization parameters associated with a particular filter, and
a combination thereof.

5. The method of claim 1, wherein coding the information for the different filters comprises including in the filter information or obtaining from the filter information, information identifying reference data used to predict the information of the one or more of the different filters that is predictively coded.

6. The method of claim 1, further comprising calculating a sum-modified Laplacian value as a value of the activity metric.

7. The method of claim 6, wherein the sum-modified Laplacian value comprises var(i,j) defined approximately according to the following equation:

$$\text{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)|$$

wherein k represents a value of a summation from −K to K and l represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

8. The method of claim 1, wherein coding the information for the different filters comprises coding, using parameterized variable length codes, one or more sets of filter coefficients that define the different filters.

9. The method of claim 1, wherein the coded unit is selected from the group consisting of:
a video frame,
a portion of a video frame,
a group of pictures (GOP), and
a combination thereof.

10. The method of claim 1, wherein for the second range of values of the activity metric, the filter information includes:
information identifying a reference coding unit used to predict one or more sets of filter coefficients associated with the predictively coded information, and
difference values indicative of differences between the one or more sets of filter coefficients and a set of filter coefficients associated with the reference coding unit.

11. An apparatus that codes video data, the apparatus comprising a video coder configured to:
code a unit of the video data; and
code information for different filters associated with a filtering of pixel data of the coded unit, the different filters being defined for the coded unit based on different values of an activity metric that quantifies activity associated with one or more sets of pixels within the coded unit, the video coder being configured to code the information for the different filters by:
directly coding, for filter information, the information of one or more of the different filters for a first range of values of the activity metric, and
predictively coding, for the filter information, the information of one or more of the different filters for a second range of values of the activity metric by using predictive filter coefficients and residual filter coefficients.

12. The apparatus of claim 11, wherein the video coder comprises an encoder configured to: code the unit of the video data by encoding the unit of the video data into an encoded bitstream, code the information for the different filters by encoding the information for the different filters, and output the filter information as part of the encoded bitstream.

13. The apparatus of claim 11, wherein the video coder comprises a decoder configured to: receive filter information as part of an encoded bitstream, code the unit of the video data by decoding the unit of the video data from the encoded bitstream, and code the information for the different filters by decoding the information for the different filters from the encoded bitstream.

14. The apparatus of claim 11, wherein the filter information is selected from the group consisting of:
information identifying a frame number associated with a particular filter,
information identifying a frame type associated with a particular filter,
information identifying a video block type associated with a particular filter and,
information identifying quantization parameters associated with a particular filter, and
a combination thereof.

15. The apparatus of claim 11, wherein the video coder is configured to code the information for the different filters by including in the filter information or obtaining from the filter information, information identifying reference data used to predict the information of the one or more of the different filters that is predictively coded.

16. The apparatus of claim 11, wherein the video coder is further configured to calculate a sum-modified Laplacian value as a value of activity metric.

17. The apparatus of claim 16, wherein the sum-modified Laplacian value comprises var(i,j) defined approximately according to the following equation:

$$\text{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)|$$

wherein k represents a value of a summation from −K to K and l represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

18. The apparatus of claim 11, wherein the video coder is configured to code the information for the different filters by coding, using parameterized variable length codes, one or more sets of filters coefficients that define the different filters.

19. The apparatus of claim 11, wherein the coded unit is selected from the group consisting of:
a video frame,
a portion of a video frame,
a group of pictures (GOP), and
a combination thereof.

20. The apparatus of claim 11, wherein the video coder comprises an integrated circuit.

21. The apparatus of claim 11, wherein the video coder comprises a microprocessor.

22. The apparatus of claim 11, wherein the apparatus comprises a wireless communication device that includes the video coder.

23. The apparatus of claim 11, wherein for the second range of values of the activity metric, the filter information includes:
information identifying a reference coding unit used to predict one or more sets of the filter coefficients associated with the predictively coded information, and
difference values indicative of differences between the one or more sets of filter coefficients and a set of filter coefficients associated with the reference coding unit.

24. A device that codes video data, the device comprising:
means for coding a unit of the video data; and
means for coding information for different filters associated with a filtering of pixel data of the coded unit, the different filters being defined for the coded unit based on different values of an activity metric that quantifies activity associated with one or more sets of pixels within the coded unit, the means for coding information for the different filters comprising:

means for directly coding, for filter information, the information of one or more of the different filters for a first range of values of the activity metric, and means for predictively coding, for the filter information, the information of one or more of the different filters for a second range of values of the activity metric by using predictive filter coefficients and residual filter coefficients.

25. The device of claim 24, wherein the means for coding the unit of the video data comprises means for encoding the unit of the video data into an encoded bitstream, and the means for coding the information for the different filters comprises means for encoding the information for the different filters, the device further comprising means for outputting the filter information as part of the encoded bitstream.

26. The device of claim 24, wherein the means for coding the unit of the video data comprises means for decoding the unit of the video data from an encoded bitstream, and the means for coding the information for the different filters comprises means for decoding the information for the different filters, the device further comprising means for receiving the filter information as part of the encoded bitstream.

27. The device of claim 24, wherein the filter information is selected from the group consisting of:
information identifying a frame number associated with a particular filter,
information identifying a frame type associated with a particular filter,
information identifying a video block type associated with a particular filter,
information identifying quantization parameters associated with a particular filter, and
a combination thereof.

28. The device of claim 24, wherein the means for predictively coding further comprises means for including in the filter information or for obtaining from the filter information, information identifying reference data used to predict the information of the one or more of the different filters that is predictively coded.

29. The device of claim 24, further comprising means for calculating a sum-modified Laplacian value as a value of the activity metric.

30. The device of claim 29, wherein the sum-modified Laplacian value comprises var(i,j) defined approximately according to the following equation:

$$\text{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)|$$

wherein k represents a value of a summation from −K to K and l represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

31. The device of claim 24, wherein the means for coding the information for the different filters comprises means for coding, using parameterized variable length codes, one or more sets of filters coefficients that define the different filters.

32. The device of claim 24, wherein the coded unit is selected from the group consisting of:
a video frame,
a portion of a video frame,
a group of pictures (GOP), and
a combination thereof.

33. The device of claim 24, wherein for the second range of values of the activity metric, the filter information includes:
information identifying a reference coding unit used to predict one or more sets of the filter coefficients associated with predictively coded information, and
difference values indicative of differences between the one or more sets of filter coefficients and a set of filter coefficients associated with the reference coding unit.

34. A non-transitory computer-readable storage medium comprising instructions that upon execution in a processor cause the processor to:
code a unit of the video data; and
code information for different filters associated with a filtering of pixel data of the coded unit, the different filters being defined for the coded unit based on different values of an activity metric that quantifies activity associated with one or more sets of pixels within the coded unit, the coding of information for the different filters comprising:
directly coding, for filter information, the information of one or more of the different filters for a first range of values of the activity metric, and predictively coding, for the filter information, the information of one or more of the different filters for a second range of values of the activity metric using predictive filter coefficients and residual filter coefficients.

35. The non-transitory computer-readable storage medium of claim 34, wherein the instructions cause the processor to: code the unit of the video data by encoding the unit of the video data into an encoded bitstream, code the information for the different filters by encoding the information for the different filters, and output the filter information as part of the encoded bitstream.

36. The non-transitory computer-readable storage medium of claim 34, wherein the instructions cause the processor to: code the unit of the video data by decoding the unit of the video data from an encoded bitstream, and code the information for the different filters by decoding the information for the different filters upon receiving the filter information as part of the encoded bitstream.

37. The non-transitory computer-readable storage medium of claim 34, wherein the filter information is selected from the group consisting of:
information identifying a frame number associated with a particular filter,
information identifying a frame type associated with a particular filter,
information identifying a video block type associated with a particular filter,
information identifying quantization parameters associated with a particular filter, and
a combination thereof.

38. The non-transitory computer-readable storage medium of claim 34, wherein the instructions cause the processor to code the information for the different filters by including into the filter information or obtaining from the filter information, information identifying reference data used to predict the information of the one or more of the different filters that is predictively coded.

39. The non-transitory computer-readable storage medium of claim 34, wherein the instructions cause the processor to calculate a sum-modified Laplacian value as a value of the activity metric.

40. The non-transitory computer-readable storage medium of claim 39, wherein the sum-modified Laplacian value comprises var(i,j) defined approximately according to the following equation:

$$\mathrm{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)|$$

wherein k represents a value of a summation from −K to K and l represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

41. The non-transitory computer-readable storage medium of claim 34, wherein the instructions cause the processor to code the information for the different filters by coding, using parameterized variable length codes, one or more sets of filter coefficients that define the different filters.

42. The non-transitory computer-readable storage medium of claim 34, wherein the coded unit is selected from the group consisting of:
   a video frame,
   a portion of a video frame,
   a group of pictures (GOP), and
   a combination thereof.

43. The non-transitory computer readable storage medium of claim 34, wherein for the second range of values of the activity metric, the filter information includes:
   information identifying a reference coding unit used to predict one or more sets of the filter coefficients associated with predictively coded information, and
   difference values indicative of differences between the one or more sets of filter coefficients and a set of filter coefficients associated with the reference coding unit.

\* \* \* \* \*